March 27, 1934. J. BEDFORD 1,952,354
HYDRAULIC VARIABLE TRANSMISSION MECHANISM
Filed Aug. 26, 1930
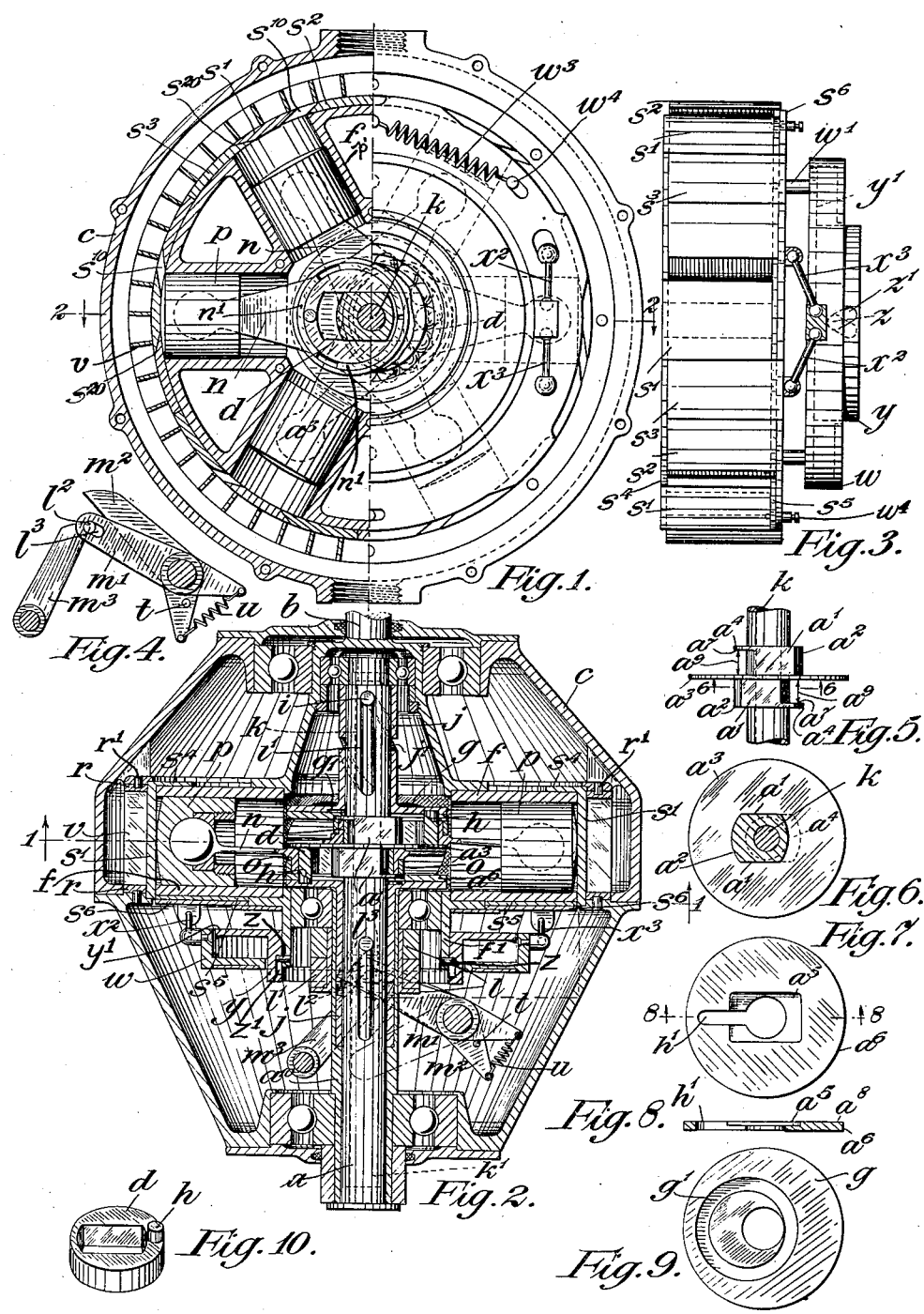
Jesse Bedford
By Marco and Clerk
Attorneys Patented Mar. 27, 1934

1,952,354

UNITED STATES PATENT OFFICE 1,952,354

HYDRAULIC VARIABLE TRANSMISSION MECHANISM

Jesse Bedford, Luton, England, assignor of one-half to Matthew Clough Park, Luton, England Application August 26, 1930, Serial No. 477,891
In Great Britain January 1, 1930

12 Claims. (Cl. 192—60)

This invention relates to hydraulic variable speed transmission mechanisms and has for its object to devise improvements in the construction and arrangement of such transmission mechanisms which will increase its efficiency and facilitate its manipulation and adjustment in operation. I attain these objects by the mechanism hereinafter described and illustrated.

The accompanying drawing illustrates several modes of carrying the invention into effect.

Figure 1 is a sectional elevation on the line 1—1 of Figure 2 of one form of mechanism according to the invention;

Figure 2 is a part cross-sectional plan on the line 2—2 of Figure 1;

Figure 3 is an outside elevation of the shutters provided at the outlets of the cylinders and also of the mechanism for operating these shutters, which mechanism is shown partly in section;

Figure 4 illustrates somewhat diagrammatically the control mechanism illustrated near the bottom of Figure 2;

Figure 5 is a fragmentary plan view of the portion of the shaft illustrated in Figure 1, which carries the adjustable discs by which adjustment of the stroke of the pistons may be effected;

Figure 6 is a section on the line 6—6 of Figure 5;

Figure 7 represents a plan of the packing disc illustrated in Figure 2;

Figure 8 is a section on the line 8—8 of Figure 7;

Figure 9 is a face view of one of the grooved flanges carried on the shaft which carries the adjustable disc above referred to;

Figure 10 is a perspective view of one of these adjustable discs;

In carrying the invention into effect in one convenient manner as illustrated in Figures 1 to 10, there is mounted, side by side, upon a shaft $a$, two circular discs $d$ (Figures 1, 2 and 10), which discs are capable of radial adjustment and are driven by or drive the shaft $a$, said discs being mounted upon a flat surface $a^1$ of cranks or eccentrics $a^2$ formed upon the said shaft. The said shaft $a$ is formed with a flange $a^3$ (Figures 5 and 6) which separates the said cranks or eccentrics $a^2$ and the latter are formed at their outer faces with flanges $a^4$, which flanges in effect render the said outer faces of the cranks or eccentrics concentric with the shaft $a$. The outer face portion of each adjustable disc is sunk into a recess $a^5$ formed in a corresponding disc $a^6$ (Figure 7) so that the inner face $a^7$ of each of the flanges $a^4$ of said outer face portions is flush with the inner surface $a^8$ of the corresponding disc $a^9$. These surfaces and the adjacent inner surfaces of the flange $a^3$ thus form smooth bearing surfaces for the adjustable discs $d$ which are of such thickness that they occupy the space $a^9$ formed between each flange $a^4$ and the disc $a^6$. The radial disposition of these discs $d$ is controlled by cam grooves $g^1$ cut in the faces of two flanges $g$ provided one on either side of the cranks or eccentrics $a^1$ and adjacent to the discs $a^6$. Projections $h$ formed on the discs $d$ engage the grooves $g^1$, a slot $h^1$ being provided in each disc $a^6$, through which slots the said projections $h$ pass to engage the grooves $g^1$. The flanges $g$ are mounted upon the shaft $a$ by means of rotatable sleeves $j$, the latter being provided with helical slots $j^1$ clearly indicated in Figure 2 and one of said sleeves $j$ being housed between the shaft $a$ and a sleeve $a^{10}$ fixed to this shaft. Two pins $i$ engage these slots and pass through the shaft $a$ engaging axial slots $i^1$ formed therein and are attached to a rod $k$ passing through an axial bore $k^1$ formed in the shaft $a$. One of the pins $i$ further engages a collar $l$ which is grooved peripherally to receive another collar $l^1$, which latter is provided with a pin $l^2$ which engages a slot $l^3$ (Figure 4) provided at the end of a lever $m^1$. The collars $l$, $l^1$ are adapted to be moved axially under the control of a lever $m^1$ and in doing so cause axial movement of the pins $i$ and rod $k$ so that the pins $i$ are moved axially and by engagement with the helical slots $j^1$ they cause rotation of the sleeves $j$ carrying the discs $g$. Rotation of the discs $g$ causes the cam grooves $g^1$ therein to actuate the projections $h$ on the discs $d$ whereby radial adjustment of the latter is effected. In the position of these parts illustrated in Figure 2 the lever $m^1$ is in its extreme inward position and the discs $d$ are in the position of their maximum eccentricity. In the dotted position of the lever $m^1$ also shown in Figure 2, the discs $d$ would be adjusted to a position of concentricity with the shaft $a$.

The connecting rods $n$ are attached alternately to the discs $d$, in this instance three to each, and in this particular case the rods are provided at their inner ends with part cylindrical portions $n^1$ which bear upon the discs $d$, being retained thereon by means of an outer collar $o$. The other ends of the connecting rods are attached to pistons $p$, the method of attachment employed in the mechanism illustrated in these figures being of the ball and socket type.

The pistons are freely mounted in radial cylinders $p^1$ formed in a block $f$ which is rotatable upon the main axis; the second shaft $b$ is attached to the frame $f$ or to an extension thereof, the two shafts $a$ and $b$ being suitably mounted and carried in a main casing $c$.

Peripherally disposed to the frame $f$ are two rings $r$, in this instance attached to the casing $c$ by pins $r^1$ (Figure 2), which rings carry a number of radial and suitably shaped vanes $v$.

The ends of the cylinder bores are controlled by sets of shutters $s^1$, $s^2$, $s^3$, fitting closely to the outer periphery of the cylinder frame $f$ just within the vane ring and formed integrally with rings or flanges denoted respectively by $s^4$, $s^5$, $s^6$. The shutters $s^1$ and their carrying rings $s^4$ are fixed to the cylinder frame $f$ but the rings $s^5$ and $s^6$ which are mounted adjacently to one another may be partially rotated to cause their appropriate shutters to move either towards or away from the fixed shutters $s^1$. Thus, when the ring $s^5$ is rotated in a clockwise direction (Fig. 1) the shutters $s^2$ will move away from the shutters $s^1$, ports $s^{10}$ being thus formed between the adjacent edges of the shutters, through which ports working fluid may be ejected from or entrained into the cylinders. The said adjacent edges are inclined as shown in Figure 1 so that working fluid issuing from the cylinders may be directed in a direction substantially tangential to the cylinder frame to impinge upon the vanes $v$. In the same way anti-clockwise movement of the ring $s^6$ causes oppositely inclined ports $s^{20}$ to be formed between the shutters $s^3$ and $s^1$. The ports $s^{10}$ formed by movement of the ring $s^5$ correspond to forward operation of the mechanism, while the ports $s^{20}$ formed by movement of the ring $s^6$ correspond to reverse operation.

The control of these shutters and ports is through the medium of the lever $m^1$ above referred to and also levers $m^2$ and $m^3$. As the lever $m^2$ is turned clockwise into the position indicated in Figure 2, the lever $m^1$ is caused to follow, being pulled up against the stop $t$ connected to the said lever $m^2$ by means of a spring $u$. During the first stage of the movement of the levers $m^1$ and $m^2$ the discs $d$ are being adjusted as hereinbefore described and when this adjustment is complete (i. e. when the maximum eccentricity of the discs $d$ is reached) the lever $m^1$ reaches its maximum inward position whilst the lever $m^2$ may continue its inward movement, the spring $u$ being stretched. During this latter stage of the movement of the lever $m^2$ the cam-shaped end of the lever $m^2$ engages the face of a disc $w$ moving this disc axially forward which operates toggles $x^2$ and $x^3$ attached thereto, the other extremities of the toggles $x^2$ and $x^3$ being attached respectively to the shutter-carrying rings $s^5$ and $s^6$. The effect of this is to close the ports $s^{10}$ and $s^{20}$ and seal the cylinder ends. A further control is provided through the medium of the lever $m^3$ above mentioned, which lever has a cam-shaped end which engages the face of a sleeve-like projection $y$ provided on a disc $y^1$ (Figures 2 and 3). As the lever $m^3$ turns anti-clockwise from the position indicated in Figure 2 it moves the disc $y^1$ forwards and this disc receives a rotary displacement due to inclined slots $z^1$ in the sleeve $y$ engaging fixed pins $z$ in the boss $f^1$ of the frame $f$. This rotary displacement is imparted to the shutter-carrying ring $s^5$ through pins $w^1$ carried on said ring $s^5$ and passing through slots provided in the shutter-carrying ring $s^6$. Thence movement is imparted to the rings $s^6$ through the medium of the said toggles.

The rings $s^5$ and $s^6$ are returned through the action of springs $w^3$, Fig. 1, one end of which is anchored to the ring $s^6$ and the other to the frame $f$ by means of pins $w^4$ which pass through suitable slots in both rings $s^5$ and $s^6$.

It will be observed that in the normal position of the rings $s^5$ and $s^6$ as indicated in Figures 1 and 2, one set of ports $s^{10}$ is open in such a manner as to permit rotation of both shafts $a$ and $b$ in the same direction, this condition being ensured through the operation of the levers $m^1$ and $m^2$.

Operation of the lever $m^3$ in addition to levers $m^1$ and $m^2$ causes the opposite ports $s^{20}$ to be opened, and the previously opened ports $s^{10}$ to be closed simultaneously so that the shafts $a$ and $b$ may be rotated in opposite directions.

In the neutral position of the mechanism the shutters $s^2$ and $s^3$ are adjusted so as to close all the ports $s^{10}$ and $s^{20}$ and the discs $d$ are adjusted to their position of concentricity.

It is to be understood that the lever mechanism $m^1$, $m^2$ and $m^3$ is duplicated, one such mechanism being provided on each side of the central shaft $a$.

In the operation of the gear, when the discs $d$ are adjusted so that the eccentricity is zero and the driving shaft $b$ is rotated there will be no movement of the pistons $p$ within the cylinders $p'$ and no tendency for the cylinder block $f$ to rotate, the gear being thus in what may be termed neutral position. However, if the eccentrics are adjusted to give a throw, then on rotating the driving shaft, the driven shaft being assumed to be connected to a load, there will be a tendency for the pistons to be reciprocated in their cylinders and for the fluid to be circulated thereby. Assuming the ports $s^{10}$ to be open, outward movement of the pistons will project fluid through such ports at an angle and the reaction due to such projection will be transmitted to the driven shaft. The projected fluid is received by the fixed vanes $v$ which act to check the movement of the fluid within the casing after its discharge from the cylinders and thus enable a net torque to be realized from the kinetic energy of the fluid which, it will be understood, must subsequently re-enter the cylinders on the inward stroke of the pistons. The torque thus produced, which may be referred to for convenience as the dynamic torque, tends to rotate the cylinder block in a direction away from that in which the working fluid is ejected from the cylinders. Any resistance which the ports oppose to the ejection of fluid will also give rise to a static torque which will tend to cause the cylinder block as a whole to move in the direction of rotation of the driving shaft. In the position of forward drive the direction of the port opening is such that the dynamic torque and the static torque are cumulative. At high velocity ratios the ports are open to a maximum extent, the dynamic torque is at a maximum, and the static torque at a minimum. As the velocity ratio decreases the ports are gradually closed and the eccentricity increased until finally in "top" gear when the velocity ratio is unity the ports are completely closed, the torque is wholly static and driven and driving shafts rotate together as a solid mechanical unit.

Reversal of the gear is obtained by opening ports $s^{20}$ whose inclination is such that the dynamic torque opposes the static torque and it follows that the available velocity ratio in reverse is limited to relative speeds and port openings at which the dynamic torque exceeds the static torque since when the gear is in reverse these two forms of torque are opposed.

It will further be understood that the details of construction hereinbefore described by way of example may be modified to suit any particular requirements or machinery to which it may be applied.

Moreover, it may be applied to any machinery necessitating variable driving or retarding actions in any direction such for instance as self-propelled vehicles on land, air or sea, factory drives, machine tools, manipulation of heavy guns, drawbridges, turntables, cranes, lifts and the like.

Having now described my invention, what I claim as new and desire to secure by Letters Patent is:—

1. A gear of the kind referred to comprising in combination a driving member, a driven member, a plurality of cylinders secured to said driven member, pistons for operation within said cylinders, means operated from the said driving member for variably reciprocating said pistons and means adjustable to cause discharge of fluid in opposite directions from the cylinders for creating dynamic torque between the driving and driven members from the kinetic energy of the working fluid circulated by the operation of the said pistons.

2. A gear according to claim 1 wherein the said means for creating dynamic torque from the kinetic energy of the working fluid also include vanes attached to a stationary part of the gear.

3. A gear according to claim 1 wherein the means for creating said dynamic torque include jets alternatively operative for directing the flow of the working fluid and which are adapted to be brought into action to secure either forward or reverse drive.

4. A gear of the kind referred to comprising in combination a driving member, a driven member, a plurality of cylinders and pistons for operation therein, means for reciprocating said pistons so as to circulate the working fluid, means whereby the stroke of the pistons may be varied so that the quantity of fluid circulated may also be varied, said cylinders having outlets adjustable to cause the discharge of fluid in opposite directions and a plurality of vanes disposed adjacently to the said outlets, said vanes serving to assist in the creation of dynamic torque between the driving and driven members from the kinetic energy of the working fluid.

5. A continuously variable hydraulic transmission gear comprising in combination a driving shaft and a driven shaft, a reciprocable means for circulating a fluid in a closed circuit, means for variably actuating said reciprocable means from the driving shaft, and adjustable means adjustable for causing the flow of the circulating fluid in opposite directions so that it will transmit torque to the driven shaft by static reaction and dynamic reaction.

6. A gear according to claim 5, in which the means for influencing the flow of fluid is adjustable to effect the transmission of torque exclusively by static reaction.

7. A continuously variable hydraulic transmission gear comprising in combination, a driving shaft and a driven shaft, a plurality of pistons carried by said driving shaft and cylinders, for said pistons, carried by the driven shaft, a casing enclosing said cylinders to form a closed circuit in which the fluid may circulate and said cylinders having adjustable ports through which the circulating fluid is passed said ports being adjustable to direct the discharged fluid in opposite directions, means on said driving shaft adapted to reciprocate said pistons within their cylinders so as to circulate the operating fluid, said means being adjustable so as to vary the stroke of the pistons, and stationary reaction means for receiving the fluid discharged from said cylinder ports to aid in the imparting of dynamic torque to the driven shaft.

8. A variable hydraulic transmission gear including a driving and a driven shaft, a revoluble cylinder block and cylinders therein, pistons in the cylinders and connections therefrom to said shafts for circulating the fluid fixed reaction means for receiving the fluid discharged from the cylinders and means for changing the direction of discharge of the fluid from the cylinders whereby the discharge reaction against the cylinders will tend to cause the cylinder block to revolve in different directions in the gear.

9. A fluid operated gear including a driving and driven shaft, means for circulating the fluid from the driving shaft and to operate the driven shaft, said means including fluid circulating means, reaction means for receiving the fluid discharged and a shutter operable to direct the fluid discharge in different directions to create a torque by reason of the reaction of the fluid discharge and cause the gear to tend to rotate in opposite directions.

10. A fluid operated gear including driving and driven shafts, a cylinder block and pistons and cylinders therein, said cylinder block being rotatable, fixed reaction means for receiving the discharge from the cylinders, the cylinders having openings and a shutter movable over the openings to direct discharge of fluid by the pistons from the cylinders through the openings in different directions whereby the reaction of the discharge fluid will create a torque to tend to rotate the cylinder block in different directions depending on the position of the shutter.

11. A fluid operated gear including driving and driven shafts, means for circulating the fluid to create a driving torque between the shafts, means to change the path of the fluid said means being adjustable to at least three positions, in the first position to create a maximum torque between the driving and driven shafts to cause the rotation of the driven shaft in a forward direction, in the second position to reduce the torque to zero and in the third position to reverse the direction of the torque between the shafts.

12. A fluid gear comprising a casing, a cylinder block having a plurality of cylinders therein rotatable in the casing, pistons in the cylinders and operative by the driving shaft, the cylinders having ports, and shutters operable from the exterior of the casing to direct the fluid from the cylinders in a forward or backward direction said shutters being operable from the exterior of the casing.

JESSE BEDFORD.